United States Patent
Wei et al.

(10) Patent No.: US 12,456,197 B2
(45) Date of Patent: Oct. 28, 2025

(54) LESION DETECTION AND SEGMENTATION

(71) Applicant: International Business Machines Corporation, Armonk, NY (US)

(72) Inventors: Wen Wei, Palaiseau (FR); Giovanni John Jacques Palma, Velizy Villacoublay (FR); Amin Katouzian, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 17/752,506

(22) Filed: May 24, 2022

(65) Prior Publication Data

US 2023/0386032 A1 Nov. 30, 2023

(51) Int. Cl.
*G06K 9/00* (2022.01)
*G06T 7/00* (2017.01)
(Continued)

(52) U.S. Cl.
CPC ............. *G06T 7/0014* (2013.01); *G06T 7/11* (2017.01); *G06T 9/002* (2013.01); *G06V 10/44* (2022.01);
(Continued)

(58) Field of Classification Search
CPC ........ G06T 7/0012; G06T 2207/10088; G06T 2207/30016; G06T 2207/20081;
(Continued)

(56) References Cited

U.S. PATENT DOCUMENTS

| | | | |
|---|---|---|---|
| 2019/0223789 A1* | 7/2019 | Wang | A61B 5/055 |
| 2020/0202532 A1* | 6/2020 | Wang | G01R 33/5602 |
| 2020/0285714 A9 | 9/2020 | El-Baz et al. | |

FOREIGN PATENT DOCUMENTS

| | | |
|---|---|---|
| WO | WO2020/101428 A1 | 5/2020 |
| WO | WO2020/223780 A1 | 11/2020 |

OTHER PUBLICATIONS

Nazari-Farsani et al. Predicting final ischemic stroke lesions from initial diffusion-weighted images using a deep neural network, NeuroImage: Clinical, vol. 37, Science Direct (Year: 2023).*

(Continued)

*Primary Examiner* — Alex Kok S Liew
(74) *Attorney, Agent, or Firm* — CHIP LAW GROUP

(57) ABSTRACT

Mechanisms are provided for detecting lesions in diffusion weighted imaging (DWI) images. The mechanisms receive a first set of DWI images corresponding to a anatomical structure, from medical imaging computer system(s). The first set of DWI images comprises a plurality of DWI images having at least two different b-values. The mechanisms generate a second set of DWI images from the first set of DWI images based on at least one predetermined criterion. The second set of DWI images comprises different DWI images having different b-values. The mechanisms extract feature data from the second set of DWI images, input the feature data into at least one computer neural network, and generate an output from the neural network(s) comprising at least one of a lesion classification or a lesion mask based on results of processing, by the neural network(s), of the feature data extracted from the second set of DWI images.

20 Claims, 8 Drawing Sheets

(51) Int. Cl.
*G06T 7/11* (2017.01)
*G06T 9/00* (2006.01)
*G06V 10/44* (2022.01)
*G06V 10/764* (2022.01)
*G06V 10/774* (2022.01)
*G06V 10/82* (2022.01)

(52) U.S. Cl.
CPC .......... *G06V 10/764* (2022.01); *G06V 10/774* (2022.01); *G06V 10/82* (2022.01); *G06T 2207/10088* (2013.01); *G06T 2207/20081* (2013.01); *G06T 2207/20084* (2013.01); *G06T 2207/30096* (2013.01); *G06V 2201/03* (2022.01)

(58) Field of Classification Search
CPC . G06T 2207/30096; G06T 2207/20084; G06T 7/11; G06T 2207/10092; G06T 7/0014; G06T 2207/30081; G06T 11/008; G06T 2207/30004; G06T 2207/10081; G06T 2207/10104; G06T 2207/20076; G06T 7/0002; G06T 7/10; G06T 11/003; G06T 2200/04; G06T 2207/10084; G06T 2207/10121; G06T 2207/10132; G06T 2207/10136; G06T 2207/20036; G06T 2207/20104; G06T 2207/30048; G06T 2207/30168; G06T 5/00; G06T 5/70; G06T 7/0016; G06T 7/149; G06T 7/155; G06T 7/254; G06T 7/30; G06T 7/344; G06T 7/49; G06T 7/97; G06T 11/006; G06T 2207/20221; G06T 2207/30024; G06T 2207/30056; G06T 2207/30204; G06T 2210/41; G06T 2211/441; G06T 5/50; G06T 7/37; G06T 7/74; G06T 9/00; G06V 10/82; G06V 10/764; G06V 10/26; G06V 10/454; G06V 2201/03; G06V 10/22; G06V 10/25; G06V 10/40; G06V 10/50; G06V 10/758; G06V 10/761; G06V 10/774; G06V 10/778; G06V 10/811; G06V 2201/031; G06V 10/28; G06V 10/70; G06V 10/771; G06V 10/7715; G06V 10/7753; G06V 10/806; G06V 10/96; G06V 20/64; G06V 20/69; G06V 20/698

See application file for complete search history.

(56) References Cited

OTHER PUBLICATIONS

Christ, Patrick F. et al., "Survivalnet: Predicting Patient Survival From Diffusion Weighted Magnetic Resonance Images Using Cascaded Fully Convolutional and 3D Convolutional Neural Networks", arXiv:1702.05941v1 [cs.CV] Feb. 20, 2017, 5 pages.

* cited by examiner

US 12,456,197 B2

LESION DETECTION AND SEGMENTATION

BACKGROUND

The present application relates generally to an improved data processing apparatus and method for lesion detection and segmentation, and more specifically multi-b value diffusion weighted imaging lesion detection and segmentation using neural networks, e.g., transformers.

Diffusion-weighted imaging (DWI) is the use of specific magnetic resonance imaging (MRI) sequences, as well as software that generates images from the resulting data that uses the diffusion of water molecules to generate contrast in magnetic resonance images. DWI allows the mapping of the diffusion process of molecules, mainly water, in biological tissues, in vivo and non-invasively. Molecular diffusion in tissues is not random but reflects interactions with many obstacles, such as macromolecules, fibers, and membranes. Water molecule diffusion patterns can therefore reveal microscopic details about tissue architecture, either normal or in a diseased state.

In DWI, the intensity of each image element (voxel) reflects the best estimate of the rate of water diffusion at that location. Because the mobility of water is driven by thermal agitation and highly dependent on its cellular environment, the hypothesis behind DWI is that findings may indicate pathologic change. For instance, DWI is more sensitive to early changes after a stroke than more traditional MRI measurements, such as T1 or T2 relaxation rates.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for detecting lesions in diffusion weighted imaging (DWI) images. The method comprises receiving a first set of DWI images corresponding to a given anatomical structure, from at least one medical imaging computer system. The first set of DWI images comprises a plurality of DWI images having at least two different b-values. The method further comprises generating a second set of DWI images from the first set of DWI images based on at least one predetermined criterion. The second set of DWI images comprises different DWI images having different b-values. The method also comprises extracting feature data from the second set of DWI images, inputting the feature data into at least one computer neural network, and generating an output from the at least one computer neural network comprising at least one of a lesion classification or a lesion mask based on results of processing, by the at least one computer neural network, of the feature data extracted from the second set of DWI images.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
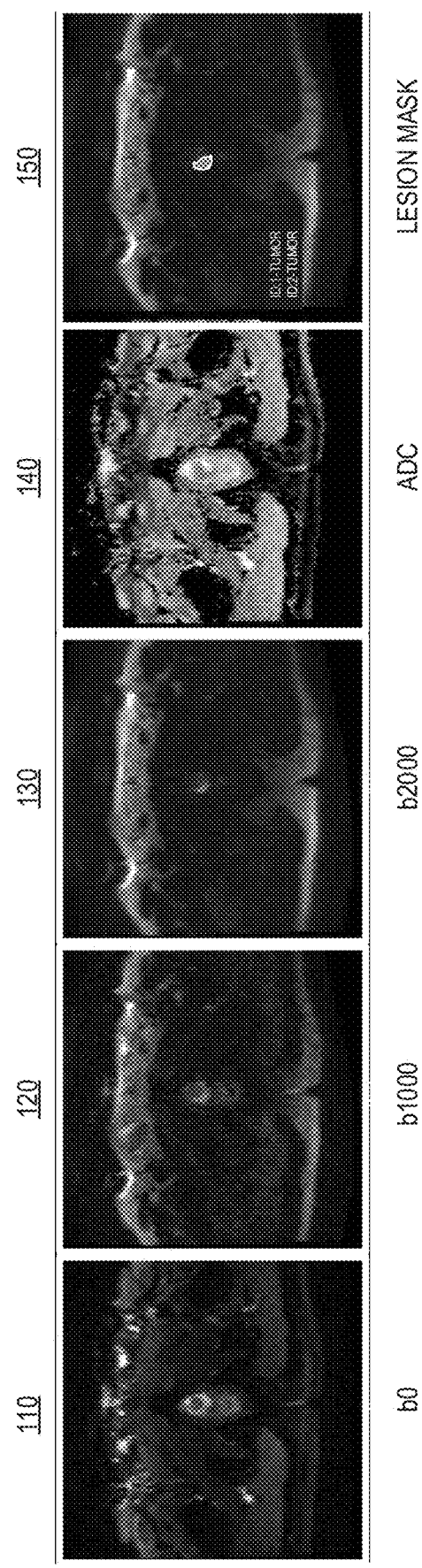
FIG. 1 is an example diagram showing medical images with different b-values along with apparent diffusion coefficient (ADC), and illustrating the clarity of the images and a prostate lesion in accordance with one illustrative embodiment.

In magnetic resonance imaging (MRI), diffusion-weighted imaging (DWI) images are captured by MRI equipment, and corresponding computing systems and data storage systems, for measuring and visualizing the motions of water molecules within organs and tissues of a biological subject, e.g., a human or animal patient. For example, DWI images are very useful to diagnose vascular strokes in the brain. DWI is also used more and more in the staging of non-small-cell lung cancer. More recently, it has been determined that DWI may be used for capturing images for prostate lesion detection, with DWI lesion scores contributing to the overall PI-RADS assessment of prostate cancer. PI-RADS is a grading system used to interpret an MRI of the prostate, where PI-RADS 1 indicates a very low likelihood of cancer, while PI-RADS 5 indicates a high likelihood of prostate cancer being present. Lesions similarly may be rated on a predefined scale of lesion scores, e.g., 1 to 5, based on the T2-w and DWI analysis, the absence/presence of dynamic contrast enhancement, and the like.

DWI is most applicable when the tissue of interest is dominated by isotropic water movement, e.g., grey matter in the cerebral cortex and major brain nuclei, or in the body, where the diffusion rate appears to be the same when measured along any axis. However, DWI also remains sensitive to T1 and T2 relaxation. T2 relaxation, also known as spin-spin relaxation or transverse relaxation, refers to the progressive dephasing of spinning dipoles resulting in decay in the magnetization in the transverse plane. Following a radiofrequency pulse, this form of relaxation occurs with the time constant T2, where T2 is the time it takes for the transverse magnetization vector to decay to 1/e or 37% of its initial magnitude. T2 relaxation occurs due to tissue-particular characteristics, primarily those that affect the rate of movement of protons, most of which are found in water molecules.

To entangle diffusion and relaxation effects on image contrast, one may obtain quantitative images of the diffusion coefficient, or more exactly the apparent diffusion coefficient (ADC). The ADC concept was introduced to take into account the fact that the diffusion process is complex in biological tissues and reflects several different mechanisms. An apparent diffusion coefficient (ADC) image, or an ADC map, is an image that more specifically shows diffusion than conventional DWI, by eliminating the T2 weighting (T2W) that is otherwise inherent to conventional DWI. ADC imaging does so by acquiring multiple conventional DWI images with different amounts of DWI weighting, i.e., different b-values, and the change in signal is proportional to the rate of diffusion.

A b-value reflects the strength and the gradient used for generating the DWI images. The b-value measures the degree of diffusion weighting applied, thereby indicating the amplitude (G), time of applied gradients ($\delta$), and duration between the paired gradients ($\Delta$) and is calculated as $b=\gamma^2 G^2\delta^2 (\Delta-\delta/3)$. Therefore, a larger b-value is achieved by increasing the gradient amplitude and duration and by widening the interval between paired gradient pulses. To sense slow moving water molecules and smaller diffusion distances, b-values should be higher, e.g., b=500 s/mm2 The ADC is calculated using different b-values (e.g., 0-1000 s/mm2) A useful rule of thumb is to choose the b-value such that (b×ADC) is approximately equal to 1.

In general, lower b-value DWI images provide relatively clearer images for viewing of organs, tissues, and the like, i.e., it is easier to differentiate the various anatomical structures in images with lower b-values. However, lower b-value DWI images do not clearly identify any lesions that are present in the images. Higher b-value DWI images provide a less clear image, i.e., there is more noise in the image, but lesions are easier to identify and are more prominently represented in the images. Thus, for example, a b-value of b0 provides a clear image, but one cannot clearly detect and segment the lesion present in the image. A b-value of b2000 provides a much less clear image, but the lesion is more prominently present in the image and can be more easily detected and segmented to generate a lesion mask. Thus, using a single b-value DWI image does not provide for both a clear image and clearly identifiable lesion detection and segmentation.

The illustrative embodiments provide an improved computing tool and improved computing tool operations that are specifically directed to improving the way in which computer medical imaging and lesion detection are performed, and specifically with regard to performing lesion detection and segmentation from multi-b value diffusion-weighted imaging (DWI). More specifically, the illustrative embodiments provide an improved computing tool and improved computing tool operation that generates a DWI image set or subset from a plurality of different sets of original images, each being associated with a different b-value. The DWI image set or subset may be generated by applying DWI image selection rules to the available DWI image sets available, where these selection rules may base the selection on b-values associated with the available DWI image sets obtained from DWI based imaging systems. In some illustrative embodiments, the DWI image subset may be generated, at least in part, by applying a diffusion computer model to generate new DWI image sets based on an interpolation or extrapolation of the available DWI image sets. The diffusion computer model generates a new DWI image set whose b-value is not represented in the original DWI image sets available from the DWI based imaging systems, e.g., if the original DWI image sets comprise DWI image sets for a b value of b0 and b1000, the diffusion computer model may generate new DWI image sets for b values of b500 and/or b2000. The DWI image subset represents a multi-b value DWI image subset as it is composed of images with different b-values. In some illustrative embodiments, the DWI image selection rules may comprise generation rules for generating ADC image(s) which can also be included into the subset. If ADC is not available, the illustrative embodiments may utilize the diffusion computer model to generate ADC with available DWIs and then the generated ADC will be added into the subset.

The multi-b value DWI image subset, potentially with the ADC, is then processed by a DWI processing mechanism comprising a feature extraction computer model and one or more computer neural networks (also referred to as artificial neural networks), which in some illustrative embodiments comprises a multi-head transformer. It should be appreciated that while the present description will utilize embodiments in which the one or more computer neural networks comprise a multi-head transformer having an internal transformer comprising an encoder and a decoder, and being coupled to a plurality of heads, such as a classification head and a segmentation head, the illustrative embodiments are not limited to such and other computer neural network architectures may be provided in other illustrative embodiments without departing from the spirit and scope of the present invention. That is, the present invention encompasses architectures having one or more computer neural networks that are specifically configured to operate on a set of multi-b value DWI images to generate lesion predictions (lesion detection) and/or lesion contours or masks (lesion segmentation), and these architectures may have many different configurations, one of which is a multi-head transformer as described hereafter. For example, in some illustrative embodiments, rather than having a multi-head transformer, a single head transformer may be provided. Still further, rather than using transformers, which are a specific type of deep learning neural network architecture that includes self-attention mechanisms, other types of computer neural networks may be provided including other types of convolutional neural network architectures, multi-layer perceptron neural networks, deep learning neural networks, recurrent neural networks, feed forward neural networks, generative adversarial networks, or the like. For purposes of the following description, reference will be made to an example embodiment of the one or more computer neural networks being a multi-head transformer, but it should be appreciated that similar mechanisms may be provided in other illustrative embodiments in association with these other types of computer neural networks.

The feature extraction computer model operates on the multi-b-value DWI image subset to extract a flattened set of features from the medical images which include features representative of anatomical structures, including potential lesions, and further comprising positional encoding. The flattened and positional encoded features are input to the multi-head transformer comprising an encoder/decoder architecture, to generate lesion contours as part of a segmentation operation and segmentation head, as well as a slice-level classification of the DWI image subset as to whether the images contain a lesion or not, as part of a classification operation and classification head. The multi-head transformer is trained through a machine learning process using a loss function that combines the classification loss and the segmentation loss, with corresponding classification and segmentation loss weights.

Prior to the illustrative embodiments set forth herein lesion detection and segmentation was not performed using multiple DWIs with different b-values. In fact, detecting DWI-specific lesions is a difficult task with one of the main challenges being the wide variability between individual cases which could exist with different b-values. Although higher b-value (e.g., greater than 1400 s/mm2) is currently recommended, there is no widely accepted optimal "high b-value". Instead, the acquired higher b-value DWIs commonly suffer from lower signal-to-noise ratio (SNR), more distortion artifacts and longer scan time. Moreover, with some anatomical areas, such as the prostate, the boundary between the periphery of the anatomical structures, e.g., the prostate, and other areas, such as the gas filled rectum, may sometimes show artifactual high signal intensity on high b-value DWIs, which complicates image interpretation.

With prior prostate cancer lesion detection mechanisms, the unique final detected lesions are given based on multi-parametric MRIs (mp-MRIs) or bi-parametric plexus MRIs (bp-MRIs). However, by doing so, some DWI-specific lesions could be missing since the model may give more attention on the other sequences, such as T2-w. In fact, it has been determined herein that DWI is the dominant sequence for peripheral zone lesions which account for 70%-75% of all prostate carcinomas. Therefore, by complementing the detected DWI-specific lesions, the overall performance for lesion detection, segmentation, and classification can be boosted. The illustrative embodiments provide a mechanism for improving DWI-specific lesion detection, segmentation, and ultimately classification by providing a multi-b-value DWI based lesion detection and segmentation mechanisms, leveraging the benefits of both low and high b-value, with a novel multi-head transformer that provides mechanisms for detection of the presence of a lesion and the generation of a lesion mask from the multi-b-value DWIs. The machine learning training of the multi-b-value DWI based lesion detection and segmentation mechanism is based on a combined loss function that combines both classification and segmentation losses which are weighted according to learned weights for directing attention of the multi-b-value DWI based lesion detection and segmentation mechanism.

Thus, the illustrative embodiments provide an improved computing tool and improved computing tool operation that operates multiple image-based artificial intelligence (AI) computer models to select DWI images of various b-values, extract features from a multi-b value set of these selected DWI images, and process the extracted features from multi-b value through a multi-head transformer that generates a classification of the images as to whether they contain a detected lesion or not, and further generates a lesion mask for any detected lesions. The illustrative embodiments operate such AI models to determine information that is not obtainable using manual or mental processes and which are specific to computer medical imaging technology. The results of the illustrative embodiments enable better and more reliable lesion characterization in magnetic resonance imaging or computerized tomography.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments provide an improved computing tool and improved computing tool operations that are specifically directed to improving the way in which computer medical imaging and lesion detection are performed. The illustrative embodiments leverage medical images captured with different b-values to extract features indicative of inter-b-value information, i.e., extract inter-b-value features from images with different b-values. The extraction of this inter-b-value feature is based on the observation that images with different b-values provide different benefits to visualizing and segmenting anatomical structures and lesions within a subject's organs, tissues, and the like. That is, DWI images with b-values that are low have greater clarity but lesions are less visible in such images. DWI images which higher b-values have less clarity overall but lesions are made more visible in the images. Thus, it would be beneficial to be able to obtain the benefits of both lower b-values and higher b-values to obtain sufficiently clear images in which the lesion is clearly identifiable.

FIG. 1 is an example diagram showing medical images with different b-values along with ADC, and illustrating the clarity of the images and a prostate lesion in accordance with one illustrative embodiment. As shown in FIG. 1, a first DWI image 110 having a relatively lower b-value of b0 has high clarity where anatomical structures of the prostate region are clearly delineated. A second DWI image 120 having a relatively higher b-value of b1000 has the lesion more clear (white area in center of the image), but the other anatomical structures are not as clearly delineated. It should be appreciated that the "lesion" in the images may represent a cancer tumor. A third DWI image 130 having a b-value of b2000 has even lower clarity overall but the lesion (white area in center of image) is even more clearly shown. It should be noticed that the lesion in DWI image 130 is not the entirety of the white area shown in DWI images 110 and 120, i.e., the lesion itself while appearing in images 110 and 120 is not clearly identifiable from the other tissues around the lesion.

The ADC image 140 is a synthetic calculated image from the other images based on a differentiation of images at different b-values, e.g., [b0-b1000]. However, as is shown in FIG. 1, even in the ADC image, the lesion is not clearly differentiated from the surrounding tissues. The goal is to be able to generate a lesion mask 150 from the captured DWI images but still have a sufficient amount of clarity of the surrounding anatomical structures. To achieve this goal, and other advantages, the illustrative embodiments provide a multi-b-value DWI lesion detection and segmentation computing tool and computing tool operations that implement a DWI image subset selection engine and multi-head transformer architecture to perform lesion detection and segmentation.

Figure 2:
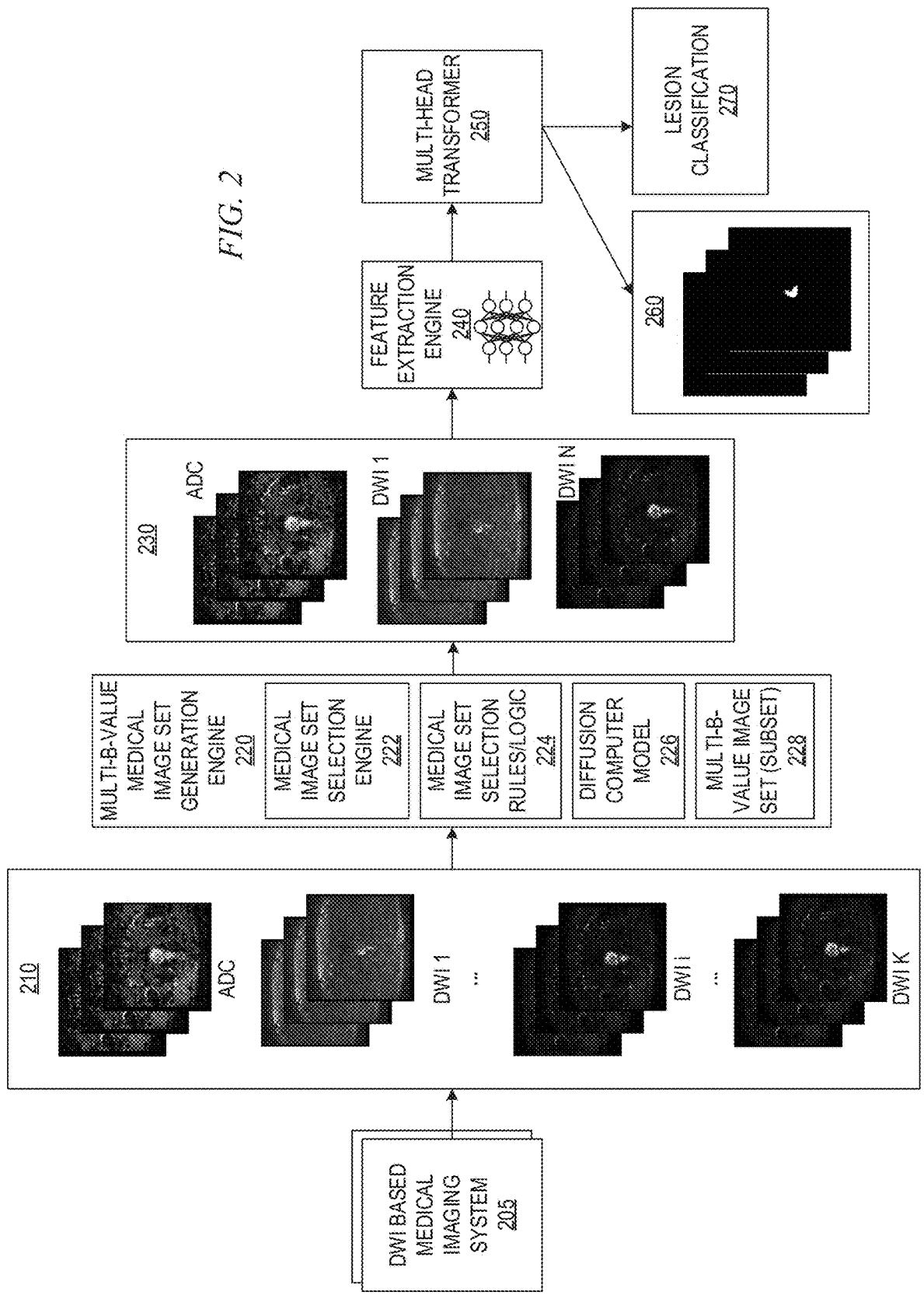
FIG. 2 is an example block diagram of the primary operational components and operational flow of a multi-b value diffusion weighted imaging (DWI) lesion detection and segmentation computer system in accordance with one illustrative embodiment.

FIG. 2 is an example block diagram of the primary operational components and operational flow of a multi-b value diffusion weighted imaging (DWI) lesion detection and segmentation computer system in accordance with one illustrative embodiment. It should be appreciated that the elements shown in FIG. 2 are implemented specifically in computer technology and specifically with regard to medical imaging computer technology and operate to improve the way in which lesion detection and segmentation are performed in such medical imaging computer technology. Thus, references to the various "engines" and the multi-head transformer in the figures is intended to reference specific computing tools and their corresponding specific computing tool operations which does not involve any human intervention or organization of human activity, let alone any mental processes.

As shown in FIG. 2, the improved computing tool of the illustrative embodiments receives as input a plurality of sets of medical images 210, preferably captured by diffusion weighted imaging (DWI) based medical image capture equipment, such as magnetic resonance imaging (MRI) and other magnetic resonance (MR) based imaging technologies. In one example embodiment, the plurality (K number) of sets of images DWI 1 . . . DWI K are captured by one or more DWI based medical imaging systems 205, such as a MRI system. The DWI based medical imaging systems 205 may comprise a diffusion-weighted magnetic resonance imaging (DW-MRI) system, for example. The DWI based medical imaging system 205 stores the images in a data storage (not shown) as separate sets of medical images DWI 1 . . . DWI K and may generate an ADC map based on the captured images. The captured sets of medical images preferably are captured using different b-values for the different sets of medical images, e.g., $b_1$, $b_i$, . . . $b_k$. For example, a first set of images may be captured using a b-value of b0, a second set of captured images may be captured using a b-value of b1000, and a third set of images may be captured with a b-value of b2000. The b-value is a setting of the DWI based medical imaging system 205. The resulting sets of medical images may be stored according to the Digital Imaging and Communications in Medicine (DICOM) standard with Type I DICOM tags. These DICOM tags may include private tags or the like that specify the b-values used to generate the corresponding captured set of images and thus, can be read by downstream computing systems to identify the b-value for the set of captured images when processing the set of captured images. It should be appreciated that references to "images" herein are references to data structures that comprise data captured by the DWI based medical imaging system 205, or generated from such captured data, and represents the internal anatomy of a subject, e.g., a human or animal patient.

The captured sets of images 210 are input to a multi-b-value medical image set generation engine 220 of the illustrative embodiments. The multi-b-value medical image set generation engine 220 operates on the input captured sets of images 210 to select and/or generate a subset of medical images 230 that comprises medical images of various b-values. Thus, the subset of medical images 230 may be referenced herein as a multi-b-value selected set of medical images 230. The multi-b-value medical image set generation engine 220 may apply selection rules to select sets of medical images from the plurality of sets of medical images 210 for inclusion in the multi-b-value selected set of medical images 230. The multi-b value medical image set generation engine 220 may also apply a diffusion computer model to the plurality of sets of medical images 210 to generate a new set of medical images having a b-value not previously represented in the plurality of sets of medical images 210. This generated set of medical images may be added to the multi-b-value selected set of medical images 230. Of course, a combination of selection rules and the diffusion computer model operation may be used to generate the multi-b-value selected set of medical images 230. The result is a selected set of medical images 230 where the images in the selected set comprise a plurality of different b-value images.

In some illustrative embodiments, the DWI image selection rules may comprise generation rules for generating ADC image(s) which can also be included into the subset. If ADC is not available, the illustrative embodiments may utilize the diffusion computer model to generate ADC with available DWIs and then the generated ADC will be added into the subset.

The multi-b-value selected set of medical images 230, which may include ADC in some illustrative embodiments, are input to a feature extraction engine 240 which extracts inter-DWI and inter-b-value features from the images in the multi-b-value selected set of medical images 230. The features are extracted by a machine learning trained artificial intelligence computer model, such as a convolutional neural network (CNN), residual neural network (ResNet), a feature pyramid network (FPN), recurrent neural network (RNN), or the like. The features are internal representations of the visual features of the input images that flatten the two-dimensional information of the various images into a one dimensional vector representation with positional encoding. Such feature extraction is generally known in the art. The feature extraction, however, is performed on a multi-b-value selected set of DWI images which means that the features extracted are inter-DWI and inter-b-value features such that the extracted features represent the beneficial aspects of low and high b-value DWI images with/without ADC.

The extracted features from the feature extraction engine 240 are provided as input to a multi-head transformer 250. A transformer is a deep learning computer model that adopts the mechanism of self-attention, differentially weighting the significance of each part of the input data. In accordance with the illustrative embodiments, the multi-head transformer 250 employs an encoder-decoder architecture where the encoder consists of encoding layers that process the input iteratively one layer after another, while the decoder consists of decoding layers that do the same thing to the encoder's output. The function of each encoder layer is to generate encodings that contain information about which parts of the input are relevant to each other. Each encoder layer passes its encoding to the next encoder layer as inputs. Each decoder layer does the opposite, taking all the encodings and using their incorporated contextual information to generate an output sequence. To do this, each encoder and decoder layer makes use of a self-attention mechanism that, for each input, weighs the relevance of every other input and draws from them to produce the output. The decoder further includes an attention mechanism over the encodings. Both the encoder and decoder layers have a feed-forward neural network for additional processing of the outputs and contain residual connections and layer normalization mechanisms. The multi-head transformer 250, contrary to other transformers, has a multi-head architecture where each of the heads is not independent of the other. To the contrary, head of the multi-head transformer 250 benefits from each other head and complements each other head.

The multi-head transformer 250, in some illustrative embodiments, comprises a first head that is a classification head comprising a machine learning trained neural network that classifies the output of the transformer as to whether the output is indicative of the input images showing a lesion being present in the images. This classification head may be a binary classification neural network or may be a non-binary classification neural network that may classify the output of the transformer with regard to multiple different lesion classifications, e.g., types of lesions. The multi-head transformer 250, in some illustrative embodiments, further comprises a second head that is a segmentation head that operates on the output of the transformer to generate a lesion mask that clearly identifies the lesion by providing output medical image data in which the lesion is marked by a mask or contour clearly identifying the location of the detected lesion that was originally present in the multi-b-value selected set of images 230. As a result, the multi-head transformer 250 outputs the lesion mask output 260 and the lesion classification 270 which may be a binary classification of whether a lesion is present (positive) or not (negative), or may be a more complex classification with regard to the presence of specific types of lesions in some illustrative embodiments. These outputs may be provided to further downstream computing systems (not shown) which may perform additional processing based on the lesion classification 270 and lesion mask output 260, e.g., in cases where the lesion classification 270 is a binary classification of a lesion being present or not, further downstream computing systems may apply additional computer executed models to the images determined to have lesions present to thereby classify the lesions as benign or cancer or the like. In some illustrative embodiments, the downstream computing systems may perform additional processing for statistical analysis of detected lesions, e.g., lesion size, position, shape, etc. In some illustrative embodiments, this additional processing may be to generate a visual or graphical output showing the lesion contour or mask in relation to other anatomical structures in a medical image output, generate a textual report specifying information about the lesion, such as dimensions and the classification, correlating the lesion information with treatment recommendations or other medical information for presentation to a user, or the like.

Figure 3:
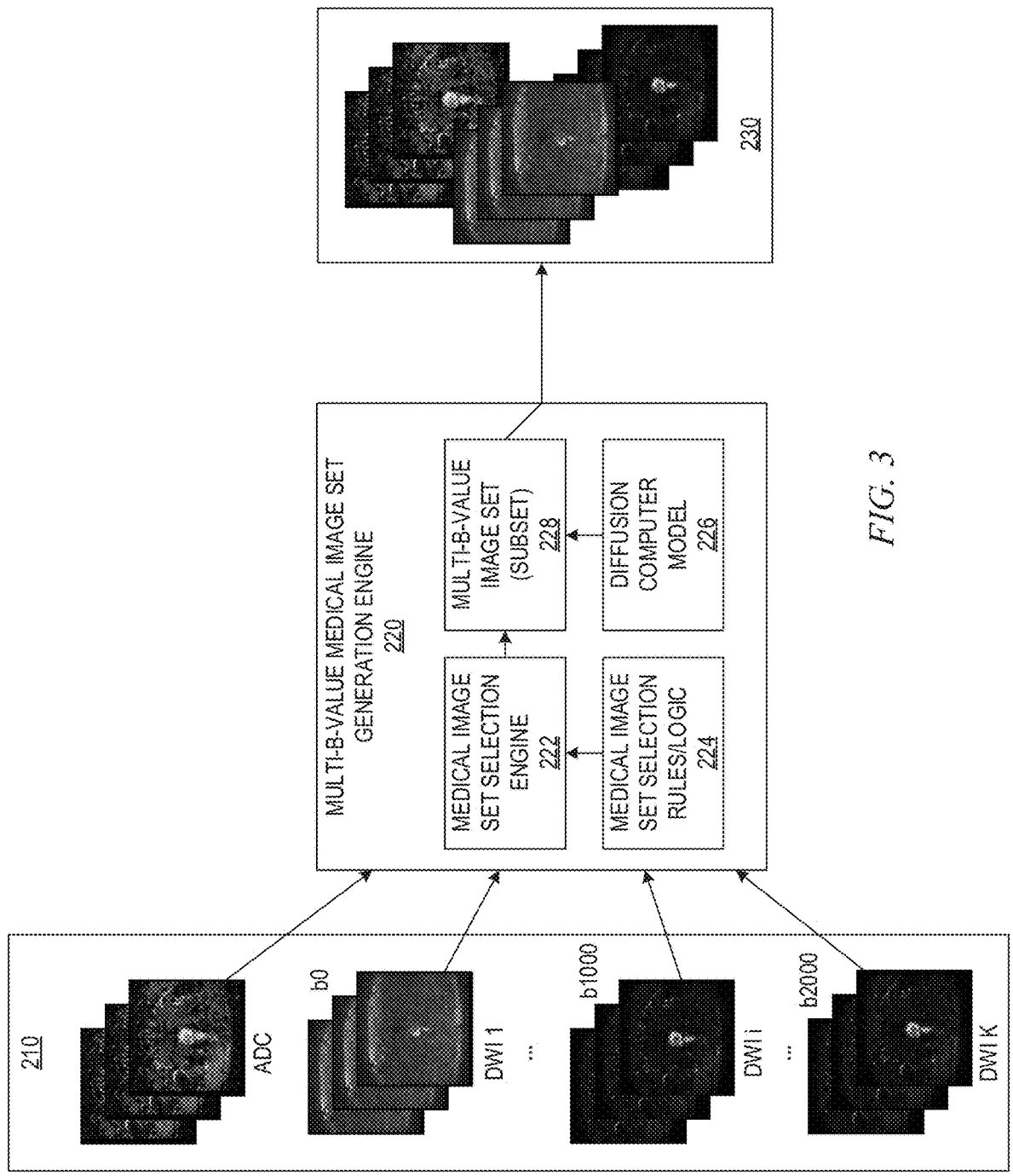
FIG. 3 is an example diagram of the primary operational components and operational flow of a multi-b value DWI image subset generation engine in accordance with one illustrative embodiment.

FIG. 3 is an example diagram of the primary operational components and operational flow of a multi-b value DWI image subset generation engine in accordance with one illustrative embodiment. The depiction in FIG. 3 focuses on the operation of the multi-b-value medical image set generation engine 220, which again receives as input DWI images 210 comprising a plurality of sets of medical images DWI 1 . . . DWI k. Each set of medical images comprises a sequence of medical images taken at a different b-value setting, e.g., b0, b1000, b2000, etc. The sets of medical images are a basis for generating a multi-b-value selected set of medical images 230 that are selected based on selection logic and application of predefined rules and/or generation of a new set of medical images at a b value not represented in the original input sets of DWI images 210. In some cases the ADC may also be provided with the input DWI images 210 (as shown in FIG. 2), or if not provided in the input DWI images 210, it may be generated by applying a diffusion computer model 226 to the input DWI images 210 to generate the ADC and add it to the selected sets of images in 230 as described hereafter.

As shown in FIG. 3, the multi-b-value medical image set generation engine 220 comprises a medical image set selection engine 222 that operates based on medical image set selection rules/logic 224 that may be applied by the medical image set selection engine 222 to the sets of DWI images 210 to select a subset of these DWI images 210 for combining into a multi-b-value medical image set 230. These rules/logic 224 may look at the distribution of b-values represented in the input sets of DWI images 210 and select a subset of these sets of DWI images 210 for inclusion in the multi-b-value medical image set 230 based on one or more selection criteria. For example, in one illustrative embodiment the rules/logic 224 may operate to select the lowest b-value set of DWI images and the highest b-value set of DWI images in the input sets of DWI images 210 for inclusion in the multi-b-value medical image set 230. In some illustrative embodiments, the ADC map may be included in the selected sets of DWI images that are included in the multi-b-value medical image set 230. In some illustrative embodiments, a set of DWI images that is closest to a median b-value may be selected. Any suitable selection criteria may be embodied in rules and/or logic 224 for application to the particular input 210 of sets of DWI images with different b-values to thereby select a subset of these sets of DWI images for inclusion in the multi-b-value set of medical images 230.

The multi-b-value medical image set generation engine 220 may include a diffusion computer model 226 that operates on the input 210 sets of DWI images for various b-values to generate a number of b-value images having b-values different from, and not represented by, the b-values of the sets of DWI images in the input 210. As noted above, in some illustrative embodiments, this diffusion computer model 226 may also operate on the input 210 to generate an ADC if it is not already present in the input 210. That is, instead of being limited to the particular b-values selected for capturing images to generate the input 210, the diffusion computer model 226 may perform interpolation and/or extrapolation of the medical images in the sets of DWI images of the input 210 to generate medical images with b-values other than those in the input 210 and also ADC, if it is necessary to the particular embodiment.

For example, the diffusion computer model 226 may extrapolate voxel values of lower b-value medical images and interpolate voxel values of medical images between different sets of medical images to generate medical images having interpolated/extrapolated voxel values thereby simulating the capture of medical images at a different b-value. As an example, given a set of DWI images at a b-value of b0 and a set of DWI images at a b-value of b1000, through interpolation/extrapolation, the diffusion computer model 226 can generate a set of medical images approximating a b-value of b500. Moreover, given a set of DWI images at a b-value of b2000, through extrapolation, the diffusion computer model 226 may generate medical images that approximate a b-value of 2500. In accordance with one illustrative embodiment, DWI and ADC can be calculated from at least two different b-value DW images by using a mono-exponential model as follows:

$$DWI_{b2}=DWI_{b1}e^{-(b2-b1)\cdot ADC}$$

When more than two DWIs with different b-values are given, least squares fitting may be used to the best fitting line for all b values. These are only examples and other models may be utilized for approximating different b-values and the ADC depending on the desired implementation without departing from the spirit and scope of the present invention.

The set selection performed by the medial image set selection engine 222 and the set generation by the diffusion computer model 226 may be used separately or in combination to generate a multi-b-value image set, or subset, 228. That is, all of the medical images from the selected sets from the input 210, and the generated medical images at different b-values, and possibly the ADC, as generated by the diffusion computer model 226, may be combined together into a single multi-b-value image set 228 that is output as the multi-b-value set 230 that is input to the feature extracting engine 240 and multi-head transformer 250 in FIG. 2.

Figure 4:
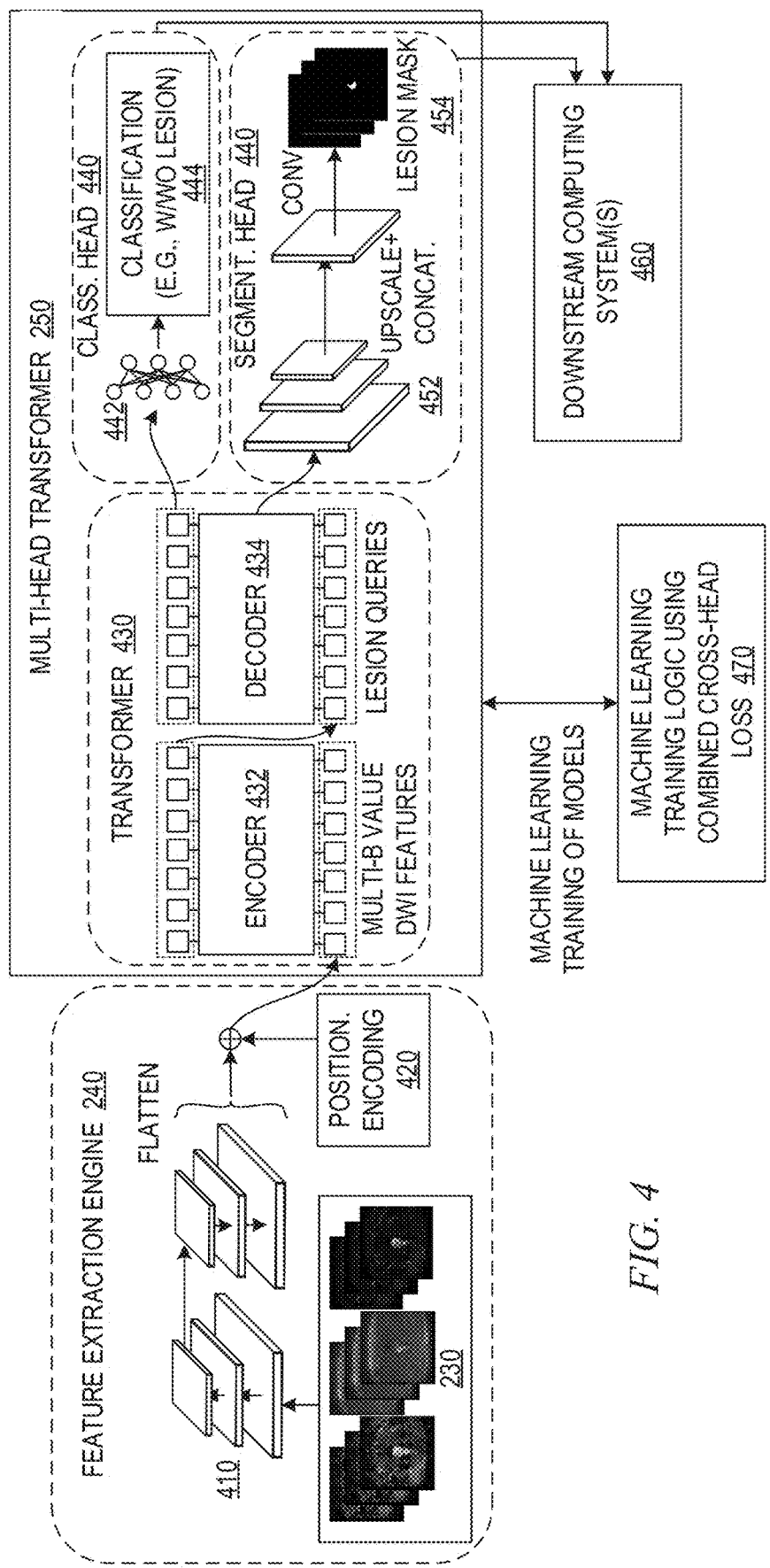
FIG. 4 is an example diagram of the primary operational components and operational flow of a multi-head transformer for slice level lesion detection and segmentation in accordance with one illustrative embodiment.

FIG. 4 is an example diagram of the primary operational components and operational flow of a multi-head transformer for slice-wise classification and lesion segmentation in accordance with one illustrative embodiment. Again, as with FIG. 2-3 above, it should be appreciated that the elements shown in FIG. 4 are implemented specifically in computer technology and specifically with regard to medical imaging computer technology and operate to improve the way in which lesion detection and segmentation are performed in such medical imaging computer technology. Thus, references to the various "engines" and the multi-head transformer in the figure is intended to reference specific computing tools and their corresponding specific computing tool operations which does not involve any human intervention or organization of human activity, let alone any mental processes.

As shown in FIG. 4, the multi-b-value set of medical images (DWI images) 230, which may include the ADC in some illustrative embodiments, are input to a feature extraction engine 240 that comprises a trained machine learning neural network 410, such as a CNN, FPN, ResNet, RNN, or the like, that operates on the image data and extracts image features, effectively flattening the features of the images into a one-dimensional vector representation that is encoded with positional encoding information 420.

Feature extraction is an important technique for complex medical image data which are suspected to be redundant. The input images 230 can be expressed in much more detail by the extracted informative and non-redundant features which are more robust to scale, occlusion, deformation, rotation, etc. The neural network 410 of the feature extraction engine 240 learns, through the machine learning process, directly from the input images without the need for manual feature extraction. The architecture of multi-head transformer 250 to which the feature extraction provides an output, is permutation-invariant, and the order of the spatial and intra-DWI features is neglected. To make use of this information, positional embedding is supplemented to the flattened input features extracted by the feature extraction engine 240 to provide information about the relative or absolute position of the spatial and intra-DWI features. In some illustrative embodiments, the sine and cosine functions may be used to provide such positional embedding. The output of the feature extraction engine 240 is a feature matrix with fixed length features (e.g., the number of columns are fixed). Each row corresponds to each pixel level feature.

Thus, the feature maps extracted by the neural network of the feature extraction engine 240 are flattened and concatenated resulting in a 2D feature map. Positional embedding is supplemented to the flattened features to provide information about the relative or absolute position of the spatial and intra-DWI features. It should be appreciated that the position encoded extracted features generated by the feature extraction engine 240 via the processing of the trained machine learning neural network 410 and positional encoding 420 represent inter-b-value and inter-DWI image features since these features are extracted from an input set of DWI images that span multiple different b-values.

The resulting extracted features are input to a transformer 430 of the multi-head transformer 240. The transformer 430 comprises an encoder 432 and a decoder 434, as previously discussed above. The encoder 432 receives the multi-b-value DWI features output by the feature extraction engine 240 and performs multiple levels of encoding with these encoded features being provided to the decoder 434 as input along with lesion queries, which may be hyperparameters of the transformer 430. The decoder 434 performs multiple levels of decoding to generate an output set of decoded features that are output to the classification head 440 and the segmentation head 450. The encoder 432 models the relationships among all the spatial and intra-DWI features at the pixel level. The objective of the decoder 434 is to decode the pixel level features which can represent the lesions in each slide. The feature extraction engine 240 only extracts the most informative information from the input images while the multi-head transformer 250 finds and models the complex relationship among all the pixels and input images, and then decodes them to present lesion information.

The lesion queries of the decoder 434 are hyper-parameters that may be randomly initialized. The lesion queries may be viewed as slots that the transformer 430 model uses to make predictions and tends to reuse to predict lesions in a given area of an image.

The output generated by the transformer 430 may comprise two outputs where one output is input to the classification head 440 for classification of the multi-b-value DWI features extracted from the multi-b-value set of medical images 230 as to whether those images include a lesion (positive) or not (negative), in the case of a binary classifier. Alternatively, the classification head 440 may classify the output from the transformer 430 as to a plurality of possible lesion classifications including no lesion, and particular types of lesions being present. The classification head 440 may comprise a machine learning trained neural network 442 that takes the output from the transformer 430 and performs a neural network based classification operation on the output from the transformer 430 to generate a classification output 444. In one illustrative embodiment, as depicted, this classification may be to indicate whether or not the input multi-b-value set of DWI images 230 has images in which there is a lesion present (positive) or not (negative), while in other illustrative embodiments, more complex classification into a plurality of possible lesion classifications may be performed.

The output from the transformer 430 may comprise a second output that is provided as input to the segmentation head 450 which includes another machine learning trained neural network 452 that performs reshaping and up-sampling and concatenation operations to transform the output 430 into a two-dimensional medical image output 454 having a lesion contour or mask specifying the location of a detected lesion, if any.

Thus, as shown in FIG. 4, the decoder 434 provides two different outputs, one to the classification head 440 and the other to the segmentation head. The multi-head cross attention layer in the decoder 434 has three inputs which, in one illustrative embodiment, are named query (Q), key (K), and value (V). Both the key (K) and value (V) matrix are derived from the encoder 432. The output from the decoder 434 to the segmentation head 450 is a cross-attention map of the multi-head cross attention layer in the decoder 434. This cross-attention map is calculated using the query and key matrix, e.g., $Q \cdot K^T$. The output from the decoder 434 that is provided to the classification head 440 is the matrix calculated by using Q, K, V which, in one illustrative embodiment, is defined as follows:

$$\mathrm{softmax}\left(\frac{Q \cdot K^T}{\sqrt{d_k}}\right)V.$$

Since the feature maps were flattened before feeding into the transformer 430, the cross-attention map needs to be recovered to the original size through shape and up-sampling process. The output of the classification head 440 is the probability of an input slice containing a lesion, in the case of a binary classifier the output being that the slice includes (positive) a lesion or does not include (negative) a lesion. The output of the segmentation head is the lesion contour.

As can be seen from the above description, the multi-head transformer 240 generates a slice-wise lesion detection output 444 from the classification head 440 and a lesion mask 454 from the segmentation head 450 by using multiple b-value input medical images 230. The use of multiple b-value input medical images 230 allows the lesion detection and lesion segmentation operations performed by the multi-head transformer 250 to leverage the benefits of both low b-value images and high b-value images to provide improved lesion detection and segmentation. That is, higher b-value DWI commonly suffers from lower signal-to-noise ratio (SNR), more distortion artifacts, and longer scan times. Only using higher b-value DWIs can bring a large amount of noise to the neural networks which would affect the performance significantly. In addition, although higher b-value (e.g., greater than 1400 s/mm2) is currently recommended, there is no widely accepted optimal "high b-value," resulting in a large variability between subjects in terms of high b-value DWI. The provided highest b-value of some patients may even be smaller than 1000 s/mm2 In this case, much higher b-value DWIs needs to be generated, but this process can also bring some noise which can affect the performance. Although the lesions are not clearly visible on lower b-value DWI, the image quality is better compared to higher b-value DWIs. More importantly, lower b-value DWIs can provide better anatomical information and can be regarded as a signal baseline. Thus, by including multiple different b-value image sets in the input, the viewability of lesions present in high b-value DWIs may be combined with the lower noise, clearer images for anatomical structures present in low b-value image DWIs, resulting in better lesion detection and segmentation and more clearly distinguishable outputs for downstream computing systems 460 and/or viewers.

The lesion classification output 444 and lesion mask 454 are output to downstream computing system(s) 460 for further processing and generation of outputs usable by other artificial intelligence algorithms and/or human users. As noted above, such downstream computing system(s) 460 may generate a visual output or graphical output that may be informative to users as to the detection of a lesion and its location. In some cases the downstream computing system (s) 460 may perform further processing through one or more other artificial intelligence, machine learning, or the like, computer models that perform other complex analysis, such as treatment recommendation generation or the like, based on the lesion classification output 444 and/or the lesion mask 454. In some cases, the downstream computing systems 460 may perform other beneficial operations such as lesion classification, statistical analysis, or the like, that are not practically performed by human beings either as mental or manual processes.

As noted above, the multi-head transformer 240 comprises a transformer 430 which may be implemented as machine learning trained neural network mechanisms including the encoder 432 and decoder 434, a classification head 440 comprising a machine learning trained neural network 442, and a segmentation head 450 comprising a machine learning trained neural network 452. These machine learning trained neural networks, or computer models, may be trained through a machine learning training process in which a loss function is utilized that combines the loss of the classification head 440 and the segmentation head 450. As is known to those of ordinary skill in the art, machine learning training of computer models involves the calculation of a loss which is then used as a basis for modifying operational parameters of the one or more computer models, e.g., neural networks, in an iterative manner to reduce the loss until a convergence is achieved, which may be a predetermined number of epochs or iterations having been achieved, or a threshold level of loss has been reached.

In the illustrative embodiments, the loss used to perform the machine learning training of the computer models 432, 434, 442, and 452 of the multi-head transformer 240 is a combined loss combining the loss of the classification head 440 and the loss of the segmentation head 450. For example, in some illustrative embodiments, the loss may be calculated as follows:

$$L = \lambda_{cla}L_{cla} + \lambda_{seg}L_{seg}$$

where L is the combined cross-head loss, $L_{cla}$ is the classification loss, which may be implemented, in some illustrative embodiments, as a binary cross-entropy loss, $L_{seg}$ is the segmentation loss that, in some illustrative embodiments, may be implemented by DICE loss, $\lambda_{cla}$ and $\lambda_{seg}$ are weights for each of the corresponding losses. This combined cross head loss may be used by machine learning training logic 470 to perform supervised or unsupervised machine learning training of computer models, e.g., neural networks of the elements 432, 434, 442, and 452, of the multi-head transformer 240. While binary cross-entropy loss and dice loss are described as examples herein, the illustrative embodiments are not limited to such, and other loss functions may be utilized without departing from the spirit and scope of the present invention. For example, for the classification loss, various regression losses may be used include an L1, L2 loss, hinge loss, etc. For the segmentation loss, various other types of loss functions, such as cross-entropy loss, focal loss, Tversky loss, or the like, may be utilized. However, even with other types of loss functions, it should be appreciated that the loss function L set forth above is specifically designed for the novel multi-head transformer of the illustrative embodiments. The weights in the loss function L above are hyper-parameters which may be set through a machine learning operation using a validation input data set. The weights in the loss function L above essentially makes the multi-head transformer pay different amounts of attention to corresponding heads 440, 450 by assigning the different weights.

As described above, the illustrative embodiments of the present invention are specifically directed to an improved computing tool that automatically generates a multi-b-value set of medical images, e.g., DWI images, extracts inter-b-value features and performs lesion classification and lesion segmentation of the input medical images via a multi-head transformer processing of the inter-b-value features. All of the functions of the illustrative embodiments as described herein are intended to be performed using automated processes without human intervention. While a human being, e.g., a patient, may be the subject of the medical imaging, the illustrative embodiments of the present invention are not directed to actions performed by the patient, but rather logic and functions performed specifically by the improved computing tool on the medical images taken of the patient. Moreover, even though the present invention may provide an output to a downstream computing system that ultimately assists human beings in evaluating the medical condition of the patient, e.g., whether or not the medical images of the patient include a lesion, such as a cancer tumor, the illustrative embodiments of the present invention are not directed to actions performed by the human being viewing the results of the processing performed by the downstream computing system, but rather to the specific operations performed by the specific improved computing tool of the present invention which facilitate the processing by the downstream computing system in an improved manner and ultimately the generation of the results of the downstream computing system processing that assists the human being. Thus, the illustrative embodiments are not organizing any human activity, but are in fact directed to the automated computing tool and computing tool functionality.

Figure 5:
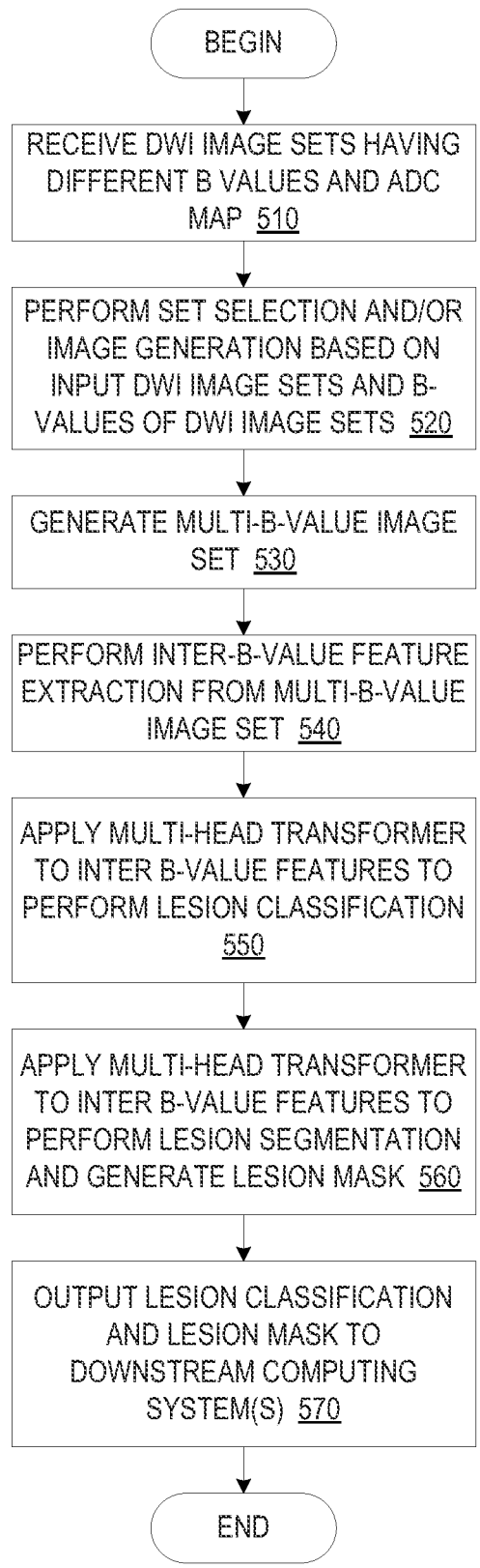
FIG. 5 is a flowchart outlining an example operation of a multi-b value diffusion weighted imaging (DWI) lesion detection and segmentation computer system in accordance with one illustrative embodiment.
Figure 6:
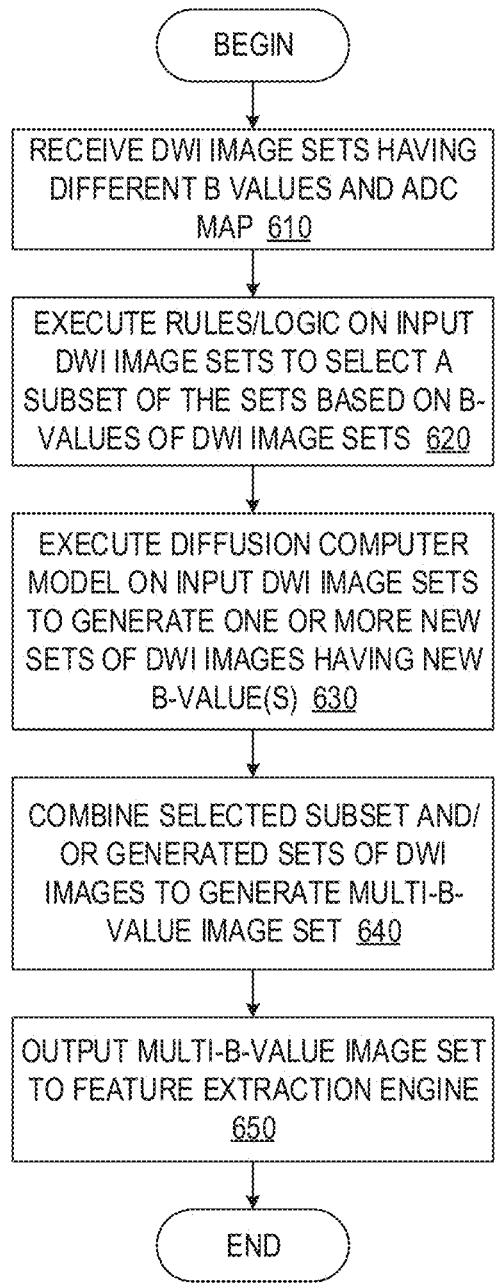
FIG. 6 is a flowchart outlining an example operation of a multi-b value DWI image subset generation engine in accordance with one illustrative embodiment.
Figure 7:
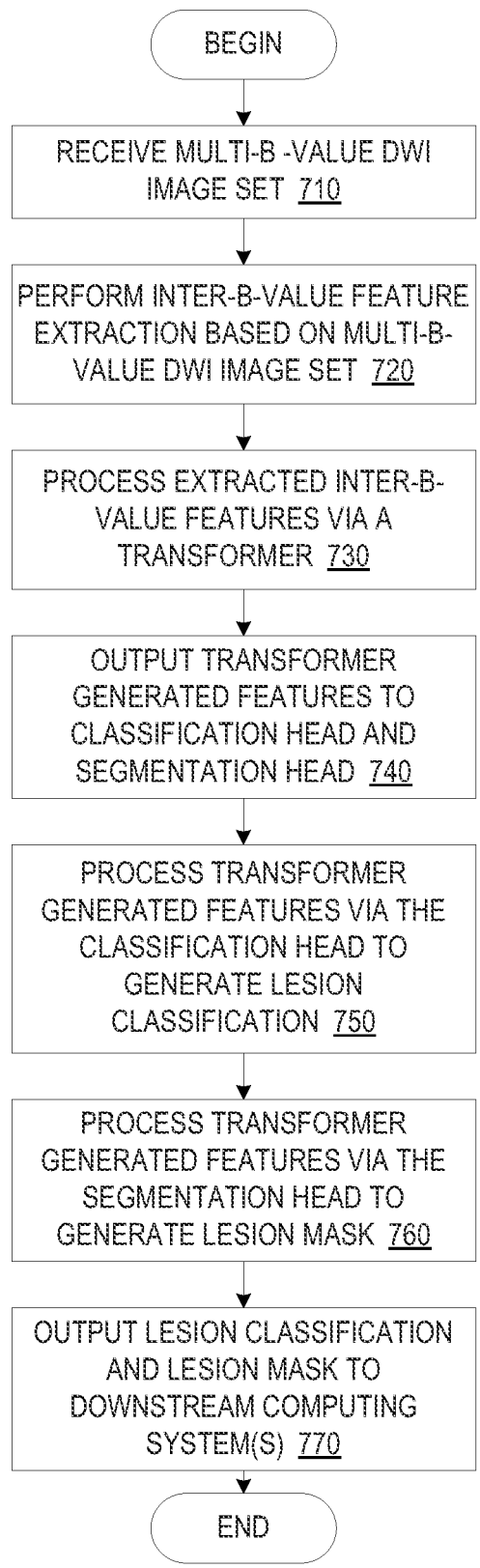
FIG. 7 is a flowchart outlining an example operation of a multi-head transformer for slice level lesion detection and segmentation in accordance with one illustrative embodiment.

FIGS. 5-7 present flowcharts outlining example operations of elements of the present invention with regard to one or more illustrative embodiments. It should be appreciated that the operations outlined in FIGS. 5-7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-7, and may, in some cases, make use of the results generated as a consequence of the operations set forth in FIGS. 5-7, the operations in FIGS. 5-7 themselves are specifically performed by the improved computing tool in an automated manner.

FIG. 5 is a flowchart outlining an example operation of a multi-b value diffusion weighted imaging (DWI) lesion detection and segmentation computer system in accordance with one illustrative embodiment. The operation outlined in FIG. 5 may be performed, for example, by the DWI lesion detection and segmentation computer system elements shown in FIG. 2, for example, in a manner corresponding to one or more of the above described illustrative embodiments.

As shown in FIG. 5, the operation starts by receiving DWI image sets having different b-values, and possibly an ADC map generated from the DWI image sets (step 510). A set selection and/or image generation is performed based on the input DWI image sets and their corresponding b-values so as to select a representative subset of DWI images sets with different b-values and/or generate one or more DWI image sets with b-values that are not represented by the original input DWI image sets (step 520).

Whether or not to generate one or more DWI image sets with different b-values may be based on a balancing of the need for more images at different b-values and the computational costs for processing additional b-value DWIs. That is, it is important to have lower b-value DWIs to provide good anatomical information and higher b-value DWIs to provide lesion specific information. In general, by going through several images from low b-value to high b-value, a lesion can be easily detected since lesion contrast should be consistent on all the images (artifacts or distortion may appear on one image but not on all the images). In this case, more images should be better for the lesion detection and segmentation task. However, each additional image will need extra computational cost. Thus, the number of generated images depends on computational resources available. Moreover, although higher b-value (e.g., greater than 1400 s/mm2) is currently recommended, there is no widely accepted optimal "high b-value". Thus, when the input set of images does not include higher b-value DWIs (e.g., greater than 1400 s/mm2), such higher b-value DWIs may be generated. Thus, the determination of whether to generate additional b-value DWIs may be based on an analysis of the input DWI image sets, their metadata specifying characteristics of the DWI, e.g., b-value, number of images, etc., to determine what b-values are represented, how many images are present needing to be processed, whether sufficiently high b-value DWIs are present, and the like, and applying rules for determining when to generate new DWIs with different b-values. In addition, if needed for the embodiment, the ADC may also be generated if not already provided in the input data.

From the selected subset of DWI image sets and/or the generated DWI image set with the previously unrepresented b-value, a multi-b-value image set is generated (step 530). An inter-b-value feature extraction is performed from the multi-b-value image set, such as by processing the multi-b-value image set through a machine learning trained neural network and applying positional encoding (step 540). A multi-head transformer is applied to the inter-b-value features to perform lesion classification (step 550). The multi-head transformer is further applied to the inter-b-value features to perform lesion segmentation and generate a lesion mask (step 560). The lesion classification and lesion mask are then output to one or more downstream computing system(s) for further processing and/or presentation of lesion mask annotated medical images and/or lesion information to a user (step 570). The operation then terminates.

FIG. 6 is a flowchart outlining an example operation of a multi-b value DWI image set generation engine in accordance with one illustrative embodiment. The operation outlined in FIG. 6 may be performed, for example, by the multi-b-value medical image set generation engine 220 and its components as shown in FIG. 3 and described above in accordance with one or more of the illustrative embodiments. The operation outlined in FIG. 6 assumes a combination of selection rules/logic and diffusion computer model execution to generate a multi-b-value DWI set, however as noted previously, such a combination is not required and each of the selection rules/logic and diffusion computer model execution may be used separately to generate the multi-b-value DWI set.

As shown in FIG. 6, the operation starts by receiving the DWI image sets having different b-values and potentially the ADC map generated from these DWI image sets (step 610). Subset selection rules/logic are applied to the input DWI image sets to select a subset of the sets based on the b-values of the DWI image sets (step 620). The diffusion computer model is executed on the input DWI image sets to generate one or more new sets of DWI images having new b-values not previously represented in the input DWI image sets (step 630). The selected subset and/or generate sets are combined to generate a multi-b-value image set (step 640). The multi-b-value image set is then output to the feature extraction engine which performs inter-b-value feature extraction as discussed previously (step 650). The operation then terminates.

FIG. 7 is a flowchart outlining an example operation of a multi-head transformer for lesion classification and segmentation in accordance with one illustrative embodiment. The operation outlined in FIG. 7 may be performed, for example, by the feature extraction engine 240 and multi-head transformer 250 as shown in FIG. 4 and described above in accordance with one or more of the illustrative embodiments.

As shown in FIG. 7, the operation starts by receiving the multi-b-value DWI image set, such as that generated as part of step 640 and output as part of step 650 in FIG. 6, for example (step 710). Inter-b-value feature extraction is performed based on the multi-b-value DWI image set (step 720). The extracted inter-b-value features are processed via a transformer (step 730) which outputs transformer generated features to a classification head and segmentation head (step 740). The classification head processes the transformer generated features to generate a lesion classification (step 750). The segmentation head processes the transformer generated features to generate a lesion mask (step 760). The lesion classification and lesion mask are output to one or more downstream computing systems (step 770). The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides improved lesion detection and segmentation by leveraging inter-b-value features obtained from a multi-b-value DWI image set. The improved computing tool implements mechanism and functionality, such as a multi-b-value DWI lesion detection and segmentation system comprising a multi-b-value medical image set generation engine, a feature extraction engine, and a multi-head transformer, and their corresponding functionalities as described above which cannot be practically performed by human beings either outside of, or with the assistance of, a technical environment, such as a mental process or the like. The improved computing tool provides a practical application of the methodology at least in that the improved computing tool is able to perform more accurate lesion detection and segmentation in medical imaging technology by leveraging inter-b-value feature extraction and artificial intelligence based processing of such inter-b-value features.

Figure 8:
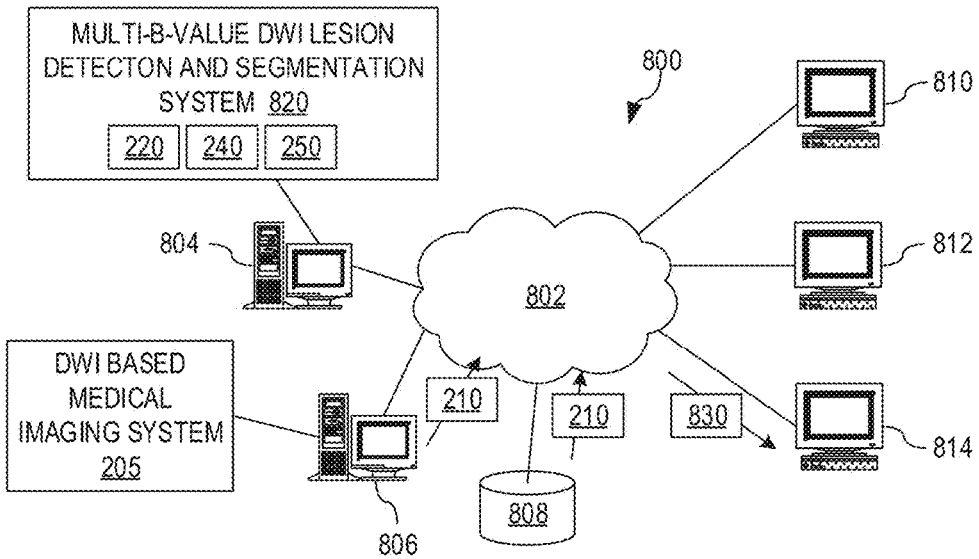
FIG. 8 is an example diagram of a distributed data processing system in which aspects of the illustrative embodiments may be implemented.
Figure 9:
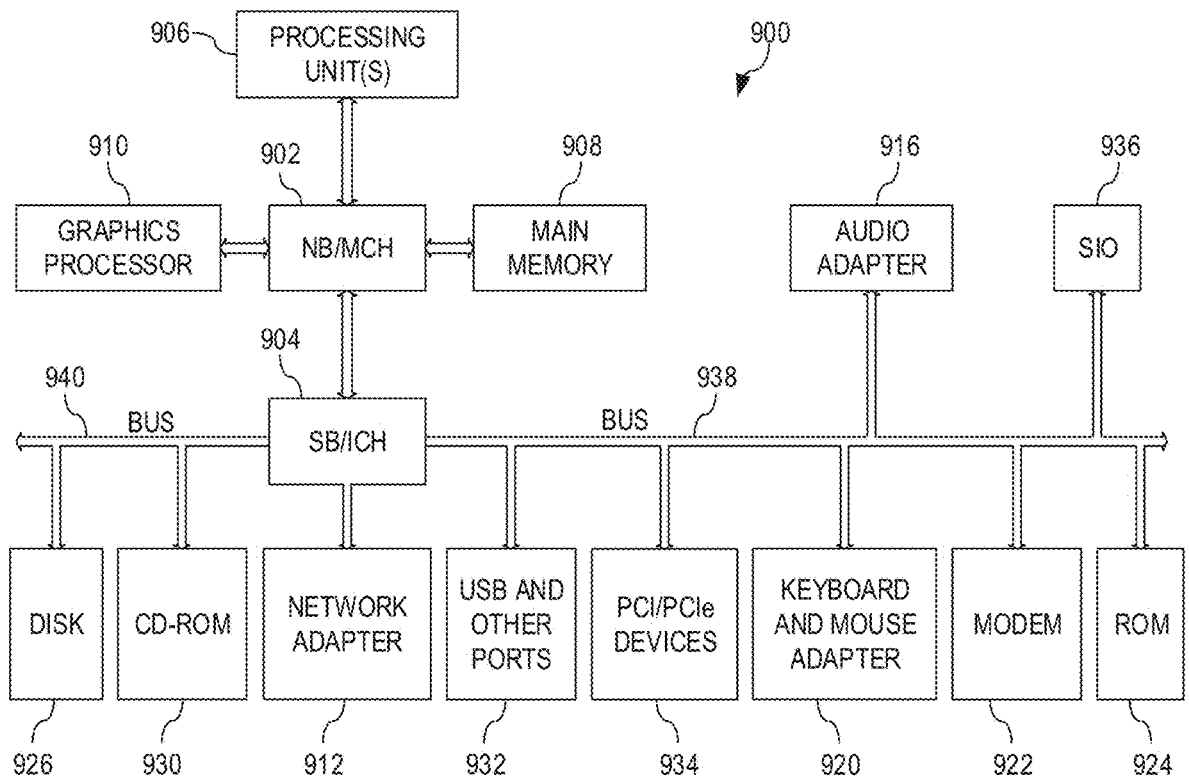
FIG. 9 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 8 and 9 are provided hereafter as example environments in which aspects of the illustrative embodiments may be implemented. It should be appreciated that FIGS. 8 and 9 are only examples and are not intended to assert or imply any limitation with regard to the environments in which aspects or embodiments of the present invention may be implemented. Many modifications to the depicted environments may be made without departing from the spirit and scope of the present invention.

FIG. 8 depicts a pictorial representation of an example distributed data processing system in which aspects of the illustrative embodiments may be implemented. Distributed data processing system 800 may include a network of computers in which aspects of the illustrative embodiments may be implemented. The distributed data processing system 800 contains at least one network 802, which is the medium used to provide communication links between various devices and computers connected together within distributed data processing system 800. The network 802 may include connections, such as wire, wireless communication links, or fiber optic cables.

In the depicted example, server 804 and server 806 are connected to network 802 along with storage unit 808. In addition, clients 810, 812, and 814 are also connected to network 802. These clients 810, 812, and 814 may be, for example, personal computers, network computers, or the like. In the depicted example, server 804 provides data, such as boot files, operating system images, and applications to the clients 810, 812, and 814. Clients 810, 812, and 814 are clients to server 804 in the depicted example. Distributed data processing system 800 may include additional servers, clients, and other devices not shown.

In the depicted example, distributed data processing system 800 is the Internet with network 802 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 800 may also be implemented to include a number of different types of networks, such as for example, an intranet, a local area network (LAN), a wide area network (WAN), or the like. As stated above, FIG. 8 is intended as an example, not as an architectural limitation for different embodiments of the present invention, and therefore, the particular elements shown in FIG. 8 should not be considered limiting with regard to the environments in which the illustrative embodiments of the present invention may be implemented.

As shown in FIG. 8, one or more of the computing devices, e.g., server 804, may be specifically configured to implement a multi-b-value DWI lesion detection and segmentation system 820, which may comprise elements previously described above, such as multi-b-value medical image set generation engine 220, feature extraction engine 240, and multi-head transformer 250. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 804, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates automatic determination of b-values and b-value differences.

As shown in FIG. 8, one or more of the servers, e.g., server 806, may be configured to operate with a DWI based medical imaging system 205 which operates to generate DWI image sets with various b-value settings. The resulting DWI image sets 210 may be stored in the server 806 and/or another storage system, such as the network attached storage system 808. The DWI image sets 210 may be provided by the server 806 or network attached storage system 808 to the multi-b-value DWI lesion and segmentation system 820 for processing in accordance with one or more of the illustrative embodiments previously described above. The multi-b-value DWI lesion detection and segmentation system 820 may generate a lesion classification output and lesion mask output which may be provided to other computing systems, such as server 806, client 814, or the like, for further processing by additional algorithms, software, or artificial intelligence computer models. For example, in one illustrative embodiment, the lesion classification and lesion mask may be provided to a medical imaging viewer application as medical imaging viewer data 830 for rendering at the client computing device 814 and presentation to a user of the client computing device 814, such as a radiologist, MRI technician, doctor, or the like.

As noted above, the mechanisms of the illustrative embodiments utilize specifically configured computing devices, or data processing systems, to perform the operations for multi-b-value DWI lesion detection and segmentation. These computing devices, or data processing systems, may comprise various hardware elements which are specifically configured, either through hardware configuration, software configuration, or a combination of hardware and software configuration, to implement one or more of the systems/subsystems described herein. FIG. 9 is a block diagram of just one example data processing system in which aspects of the illustrative embodiments may be implemented. Data processing system 900 is an example of a computer, such as server 804 in FIG. 8, in which computer usable code or instructions implementing the processes and aspects of the illustrative embodiments of the present invention may be located and/or executed so as to achieve the operation, output, and external effects of the illustrative embodiments as described herein.

In the depicted example, data processing system 900 employs a hub architecture including north bridge and memory controller hub (NB/MCH) 902 and south bridge and input/output (I/O) controller hub (SB/ICH) 904. Processing unit 906, main memory 908, and graphics processor 910 are connected to NB/MCH 902. Graphics processor 910 may be connected to NB/MCH 902 through an accelerated graphics port (AGP).

In the depicted example, local area network (LAN) adapter 912 connects to SB/ICH 904. Audio adapter 916, keyboard and mouse adapter 920, modem 922, read only memory (ROM) 924, hard disk drive (HDD) 926, CD-ROM drive 930, universal serial bus (USB) ports and other communication ports 932, and PCI/PCIe devices 934 connect to SB/ICH 904 through bus 938 and bus 940. PCI/PCIe devices may include, for example, Ethernet adapters, add-in cards, and PC cards for notebook computers. PCI uses a card bus controller, while PCIe does not. ROM 924 may be, for example, a flash basic input/output system (BIOS).

HDD 926 and CD-ROM drive 930 connect to SB/ICH 904 through bus 940. HDD 926 and CD-ROM drive 930 may use, for example, an integrated drive electronics (IDE) or serial advanced technology attachment (SATA) interface. Super I/O (SIO) device 936 may be connected to SB/ICH 904.

An operating system runs on processing unit 906. The operating system coordinates and provides control of various components within the data processing system 900 in FIG. 9. In a client device, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 900.

As a server, data processing system 900 may be, for example, an IBM eServer™ System p® computer system, Power™ processor-based computer system, or the like, running the Advanced Interactive Executive (AIX®) operating system or the LINUX® operating system. Data processing system 900 may be a symmetric multiprocessor (SMP) system including a plurality of processors in processing unit 906. Alternatively, a single processor system may be employed.

Instructions for the operating system, the object-oriented programming system, and applications or programs are located on storage devices, such as HDD 926, and may be loaded into main memory 908 for execution by processing unit 906. The processes for illustrative embodiments of the present invention may be performed by processing unit 906 using computer usable program code, which may be located in a memory such as, for example, main memory 908, ROM 924, or in one or more peripheral devices 926 and 930, for example.

A bus system, such as bus 938 or bus 940 as shown in FIG. 9, may be comprised of one or more buses. Of course, the bus system may be implemented using any type of communication fabric or architecture that provides for a transfer of data between different components or devices attached to the fabric or architecture. A communication unit, such as modem 922 or network adapter 912 of FIG. 9, may include one or more devices used to transmit and receive data. A memory may be, for example, main memory 908, ROM 924, or a cache such as found in NB/MCH 902 in FIG. 9.

As mentioned above, in some illustrative embodiments the mechanisms of the illustrative embodiments may be implemented as application specific hardware, firmware, or the like, application software stored in a storage device, such as HDD 926 and loaded into memory, such as main memory 908, for executed by one or more hardware processors, such as processing unit 906, or the like. As such, the computing device shown in FIG. 9 becomes specifically configured to implement the mechanisms of the illustrative embodiments and specifically configured to perform the operations and generate the outputs described hereafter with regard to the b-value determination engine.

Those of ordinary skill in the art will appreciate that the hardware in FIGS. 8 and 9 may vary depending on the implementation. Other internal hardware or peripheral devices, such as flash memory, equivalent non-volatile memory, or optical disk drives and the like, may be used in addition to or in place of the hardware depicted in FIGS. 8 and 9. Also, the processes of the illustrative embodiments may be applied to a multiprocessor data processing system, other than the SMP system mentioned previously, without departing from the spirit and scope of the present invention.

Moreover, the data processing system 900 may take the form of any of a number of different data processing systems including client computing devices, server computing devices, a tablet computer, laptop computer, telephone or other communication device, a personal digital assistant (PDA), or the like. In some illustrative examples, data processing system 900 may be a portable computing device that is configured with flash memory to provide non-volatile memory for storing operating system files and/or user-generated data, for example. Essentially, data processing system 900 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting lesions in diffusion weighted imaging (DWI) images, the method comprising:
   receiving a first set of DWI images corresponding to a given anatomical structure, from at least one medical imaging computer system, wherein the first set of DWI images comprises a plurality of DWI images having at least two different b-values;
   generating a second set of DWI images from the first set of DWI images based on at least one predetermined criterion, wherein the second set of DWI images comprises different DWI images having different b-values;
   extracting feature data from the second set of DWI images;
   inputting the feature data into at least one computer neural network; and
   generating an output from the computer neural network comprising at least one of a lesion classification or a lesion mask based on results of processing, by the at least one computer neural network, of the feature data extracted from the second set of DWI images.

2. The method of claim 1, wherein generating the second set of DWI images from the first set of DWI images based on the at least one predetermined criterion comprises:
   selecting a first subset of DWI images, from the first set of DWI images, having a lowest b-value relative to other b-values of other DWI images in the first set of DWI images;
   selecting a second subset of DWI images, from the first set of DWI images, having a highest b-value relative to other b-values of other DWI images in the first set of DWI images; and
   combining the first subset and second subset to form the second set of DWI images.

3. The method of claim 2, wherein generating the second set of DWI images further comprises generating an apparent diffusion coefficient (ADC) map from the first set of DWI images and combining the ADC map with the first subset and second subset to form the second set of DWI images.

4. The method of claim 1, wherein generating the second set of DWI images comprises generating a third set of DWI images from the first set of DWI images having a corresponding b-value that is not represented in the b-values associated with DWI images in the first set of DWI images.

5. The method of claim 4, wherein generating the third set of DWI images from the first set of DWI images comprises at least one of interpolating or extrapolating a number of DWI images having different b-value from the b-values associated with DWI images of the first set of DWI images.

6. The method of claim 4, wherein generating the third set of DWI images from the first set of DWI images comprises generating a number of DWI images having a higher b-value than b-values associated with DWI images in the first set of DWI images.

7. The method of claim 1, wherein extracting feature data from the second set of DWI images comprises processing the second set of DWI images as input to at least one trained neural network that flattens data corresponding to the set of DWI images and applies positional encoding to the flattened data to generate the feature data.

8. The method of claim 1, wherein the at least one computer neural network comprises a multi-head transformer that comprises an internal transformer, having an encoder and a decoder, and a plurality of heads coupled to the internal transformer that receive outputs from the decoder.

9. The method of claim 8, wherein the plurality of heads comprise a classification head that processes a first output from the decoder to generate a classification of whether the feature data input to the internal transformer indicates the presence of a lesion, and a segmentation head that processes a second output from the decoder to generate a lesion mask based on the feature data input to the internal transformer.

10. The method of claim 8, wherein the at least one computer neural network is trained through a machine learning training operation based on a combined cross-head loss function that combines a weighted classification loss associated with the classification head and a weighted segmentation loss associated with the segmentation head.

11. A computer program product comprising a computer readable storage medium having a computer readable program stored therein, wherein the computer readable program, when executed on a computing device, causes the computing device to be configured to perform lesion detection in diffusion weighted imaging (DWI) images at least by:
   receiving a first set of DWI images corresponding to a given anatomical structure, from at least one medical imaging computer system, wherein the first set of DWI images comprises a plurality of DWI images having at least two different b-values;
   generating a second set of DWI images from the first set of DWI images based on at least one predetermined criterion, wherein the second set of DWI images comprises different DWI images having different b-values;
   extracting feature data from the second set of DWI images;
   inputting the feature data into at least one computer neural network; and
   generating an output from the at least one computer neural network comprising at least one of a lesion classification or a lesion mask based on results of processing, by the at least one computer neural network, of the feature data extracted from the second set of DWI images.

12. The computer program product of claim 11, wherein generating the second set of DWI images from the first set of DWI images based on the at least one predetermined criterion comprises:
   selecting a first subset of DWI images, from the first set of DWI images, having a lowest b-value relative to other b-values of other DWI images in the first set of DWI images;
   selecting a second subset of DWI images, from the first set of DWI images, having a highest b-value relative to other b-values of other DWI images in the first set of DWI images; and
   combining the first subset and second subset to form the second set of DWI images.

13. The computer program product of claim 12, wherein generating the second set of DWI images further comprises generating an apparent diffusion coefficient (ADC) map from the first set of DWI images and combining the ADC map with the first subset and second subset to form the second set of DWI images.

14. The computer program product of claim 11, wherein generating the second set of DWI images comprises generating a third set of DWI images from the first set of DWI images having a corresponding b-value that is not represented in the b-values associated with DWI images in the first set of DWI images.

15. The computer program product of claim 14, wherein generating the third set of DWI images from the first set of DWI images comprises at least one of interpolating or extrapolating a number of DWI images having different b-value from the b-values associated with DWI images of the first set of DWI images.

16. The computer program product of claim 14, wherein generating the third set of DWI images from the first set of DWI images comprises generating a number of DWI images having a higher b-value than b-values associated with DWI images in the first set of DWI images.

17. The computer program product of claim 11, wherein extracting feature data from the second set of DWI images comprises processing the second set of DWI images as input to at least one trained neural network that flattens data corresponding to the set of DWI images and applies positional encoding to the flattened data to generate the feature data.

18. The computer program product of claim 11, wherein the at least one computer neural network comprises a multi-head transformer that comprises an internal transformer, having an encoder and a decoder, and a plurality of heads coupled to the internal transformer that receive outputs from the decoder.

19. The computer program product of claim 18, wherein the plurality of heads comprise a classification head that processes a first output from the decoder to generate a classification of whether the feature data input to the internal transformer indicates the presence of a lesion, and a segmentation head that processes a second output from the decoder to generate a lesion mask based on the feature data input to the internal transformer.

20. An apparatus comprising:
at least one processor; and
at least one memory coupled to the at least one processor, wherein the at least one memory comprises instructions which, when executed by the at least one processor, causes the at least one processor to be configured to perform lesion detection in diffusion weighted imaging (DWI) images at least by:
  receiving a first set of DWI images corresponding to a given anatomical structure, from at least one medical imaging computer system, wherein the first set of DWI images comprises a plurality of DWI images having at least two different b-values;
  generating a second set of DWI images from the first set of DWI images based on at least one predetermined criterion, wherein the second set of DWI images comprises different DWI images having different b-values;
  extracting feature data from the second set of DWI images;
  inputting the feature data into at least one computer neural network; and
  generating an output from the at least one computer neural network comprising at least one of a lesion classification or a lesion mask based on results of processing, by the at least one computer neural network, of the feature data extracted from the second set of DWI images.

* * * * *